United States Patent
Kwon et al.

(10) Patent No.: US 7,287,393 B2
(45) Date of Patent: Oct. 30, 2007

(54) CENTRAL CONTROL SYSTEM OF AIR CONDITIONERS AND METHOD FOR OPERATING THE SAME

(75) Inventors: Jae Hwan Kwon, Seoul (KR); Sang Chul Youn, Kyungki-do (KR); Duck Gu Jeon, Seoul (KR); Jae Sik Jung, Seoul (KR); Young Soo Yoon, Seoul (KR); Jun Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 568 days.

(21) Appl. No.: 10/847,369

(22) Filed: May 18, 2004

(65) Prior Publication Data
US 2004/0255601 A1    Dec. 23, 2004

(30) Foreign Application Priority Data
Jun. 19, 2003   (KR) ............... 2003-39867

(51) Int. Cl.
*F25B 49/00*   (2006.01)
*G05D 23/32*   (2006.01)
*G05D 23/00*   (2006.01)

(52) U.S. Cl. ............... 62/157; 62/126; 236/51
(58) Field of Classification Search ......... 62/157, 62/126, 228.1; 236/51
See application file for complete search history.

(56) References Cited
U.S. PATENT DOCUMENTS
2004/0107717 A1   6/2004   Yoon et al.

FOREIGN PATENT DOCUMENTS

| JP | 63302237 A | * | 12/1988 |
| JP | 2002-010532 | | 1/2002 |
| JP | 2002013778 A | * | 1/2002 |
| JP | 2002156142 A | * | 5/2002 |

OTHER PUBLICATIONS
English language Abstract of JP 2002-010532.
* cited by examiner

*Primary Examiner*—Chen Wen Jiang
(74) *Attorney, Agent, or Firm*—Greenblum & Bernstein, P.L.C.

(57) ABSTRACT

A central control system controls peak power of multiple air conditioners that includes indoor units installed in rooms of a building and an outdoor unit for controlling refrigerant circulation. A central controller is connected to the multiple air conditioners via a network to perform central control or monitoring of operations of the air conditioners. The central controller performs peak power control if current power consumption of the air conditioners, calculated based on operating states thereof, exceeds a previously input reference management power value. A signal converter is connected between the multiple air conditioners and the central controller to perform mutual conversion of different protocol signals communicated between the multiple air conditioners and the central controller. This decreases excessive electricity costs due to excessive power consumption while approximately maintaining cooling/heating efficiencies, and also prevents the entire power of the building from being cut off.

13 Claims, 5 Drawing Sheets

CENTRAL CONTROL SYSTEM OF AIR CONDITIONERS AND METHOD FOR OPERATING THE SAME

BACKGROUND OF THE INVENTION

1. Field of the Invention

The present invention relates to a central control system of air conditioners and a method for operating the same, wherein the central control system includes a central control unit connected to a multi-type air conditioning system including a plurality of air conditioners via a network to perform central control of the air conditioners, and if total power consumption of air conditioners in operation, detected by the central control unit, exceeds a previously input reference management power value, the central control unit allows selected air conditioners in operation to maintain their operating states and forces unselected air conditioners in operation to shift to a blowing mode, thereby automatically performing stable management of air conditioning power while maintaining indoor cooling/heating efficiencies.

2. Description of the Related Art

As use of air conditioners rapidly increases, air conditioners can now be found in each room of a residence or in each office of a building. An air conditioning system connected to a plurality of air conditioners via a network has also been provided recently.

FIG. 1 is a block diagram showing a multi-type air conditioning system in which a larger number of indoor units share a smaller number of outdoor units provided in a single building or on a single floor to save installation resources and energy.

To provide cooling in a room, an air conditioner 10 generally uses refrigerant that circulates in the indoor and outdoor units in a thermal cycle of compression, condensation, expansion and evaporation. On the other hand, a heat-pump air conditioner can provide cooling and heating by switching circulation directions of the refrigerant.

In the conventional air conditioning system, a control button mounted on the indoor unit or a remote controller allows a user to input a control command for power on/off, cooling/heating mode selection, blowing mode selection, control of the direction of discharged air, control of cooling/heating or blowing intensity, etc. Based on the input control command, a microcomputer embedded in the indoor unit controls the amount of refrigerant and the flow of refrigerant to perform indoor air conditioning.

If an error occurs in the operation of an air conditioner, a manager of the building personally goes to an indoor unit 11 or an outdoor unit 12 of the air conditioner to check the error, and then inputs a control command for maintenance and repair of the air conditioner.

In the case where one manager manages a plurality of air conditioners as in a school or a large building, the manager visits each room to input a control command and manually perform maintenance and repair of the air conditioner.

Some conventional air conditioning systems can perform central control of a plurality of air conditioners via a central control unit that is connected to the plurality of air conditioners over a network via power lines or the like. However, such conventional air conditioning systems are provided with only a power lamp for checking the power state of each air conditioner and a power button for controlling the power of each air conditioner. The conventional systems cannot input a control command for controlling detailed operations of the air conditioner, and thus the central control unit 20 cannot be used for maintenance and repair when an error occurs in the operation of the air conditioner, which lowers the usability of the systems.

In particular, the air conditioner has high power consumption for initial operation. In the case where a number of air conditioners are installed as in a large building, total power consumption of the air conditioners is considerable in the normal operation also, raising a concern that the total power consumption exceeds the allowable limit of a power breaker installed in the building.

If the total power consumption exceeds the allowable limit of the power breaker, the power breaker forces the entire power of the building to be cut off. The forcible power cutoff may cause a physical impact not only on running air conditioners but also on other electric devices, thereby lowering endurance of the products.

An electricity supplier provides different upper power limits depending on seasons/buildings/service providers. If the total power consumption exceeds the upper power limits, the electricity supplier charges progressive electricity rates, which increases the burden of paying the electricity bills.

SUMMARY OF THE INVENTION

Therefore, the present invention has been made in view of the above problems, and it is an object of the present invention to provide a central control system of air conditioners and a method for operating the same, wherein the central control system includes a central control unit having a database for storing information of power consumption of a multi-type air conditioning system installed in a building, and the central control unit calculates a total power consumption of air conditioners (i.e., indoor and outdoor units) currently in operation on the basis of the information stored in the database, while performing peak power control to limit the total power consumption below a reference management power value, thereby achieving stable power management.

In accordance with one aspect of the present invention, the above and other objects can be accomplished by the provision of a central control system of air conditioners, comprising a multi-type air conditioning system including a plurality of indoor units for air conditioning installed in rooms of a building and an outdoor unit for controlling circulation of refrigerant, said plurality of indoor units sharing the outdoor unit; a central control unit connected to the multi-type air conditioning system via a network, said central control unit performing central control of operations of the multi-type air conditioning system or performing monitoring of states thereof, said central control unit performing peak power control if a current power consumption of the multi-type air conditioning system, calculated based on operating states of the multi-type air conditioning system, exceeds a previously input reference management power value; and a signal converter connected between the multi-type air conditioning system and the central control unit, said signal converter performing mutual conversion of different protocol signals communicated between the multi-type air conditioning system and the central control unit.

In accordance with another aspect of the present invention, there is provided a method for operating a central control system of air conditioners, said central control system including a central control unit connected with a multi-type air conditioning system via a network, said multi-type air conditioning system including an outdoor unit connected to the central control unit and a plurality of indoor units connected to the outdoor unit, said central control unit performing central control of operations of the indoor and outdoor units, said method comprising the steps of a) calculating a current total power consumption of the multi-type air conditioning system in operation based on equipment information of the multi-type air conditioning system previously stored in a database of the central control unit; b) comparing the total power consumption with a previously input reference management power value; and c) performing peak power control to change operating modes of the indoor and outdoor units if the compared result at said step b) is that the total power consumption exceeds the reference management power value.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The configuration of a central control system of air conditioners according to the present invention will now be described with reference to FIG. 2.

Figure 1:
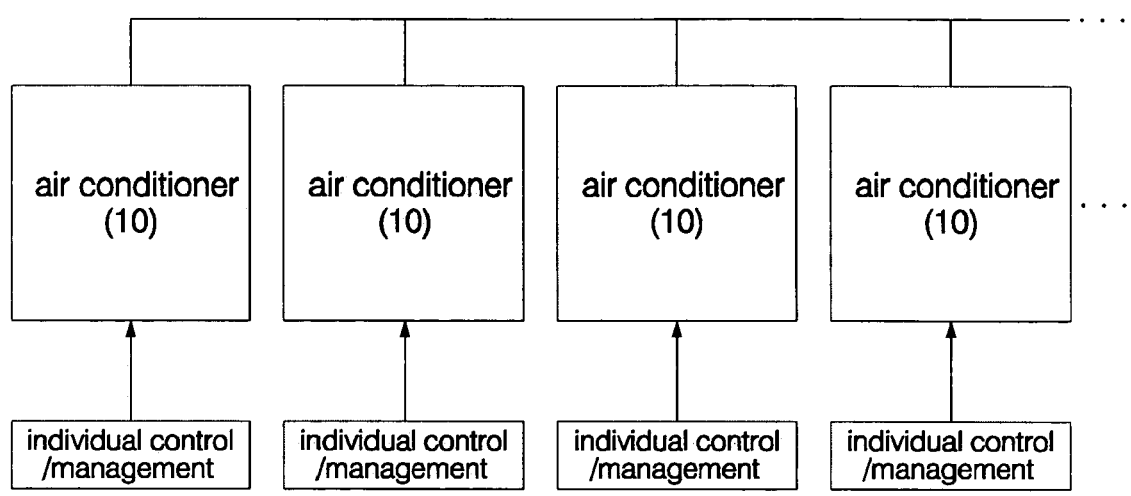
FIG. 1 is a block diagram showing the configuration of a conventional control system of air conditioners.
Figure 2:
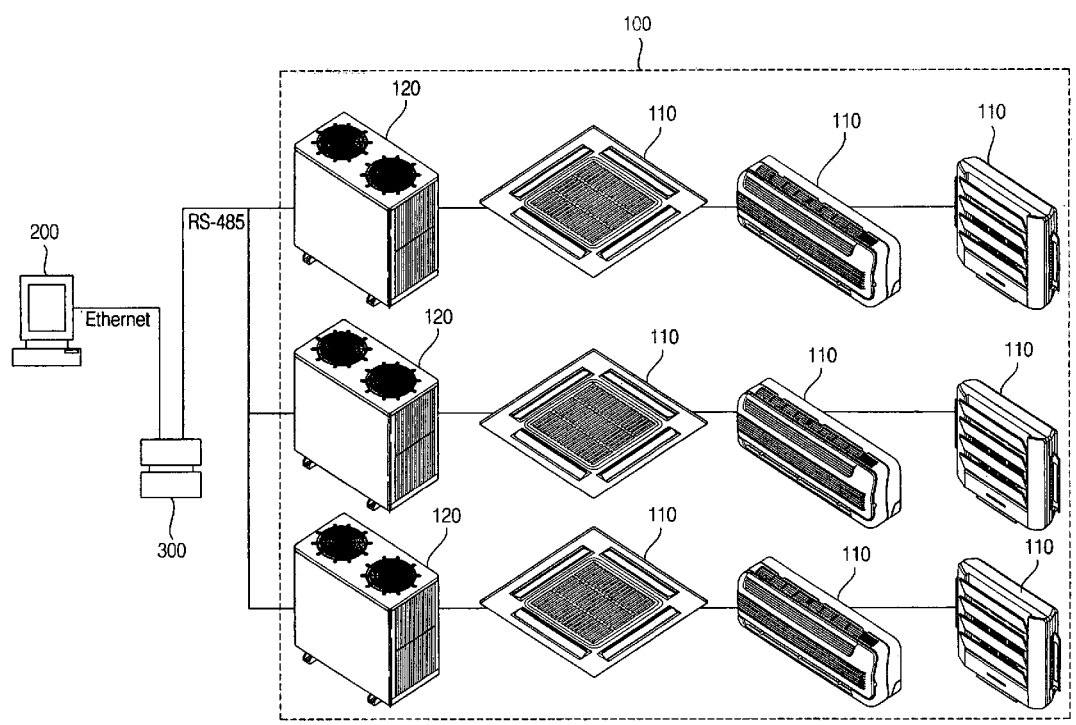
FIG. 2 is a block diagram showing the configuration of a central control system of air conditioners according to the present invention.

FIG. 2 shows a multi-type air conditioning system 100 that connects a plurality of indoor units 110 to each outdoor unit 120 and provides sufficient cooling and heating capacities for a building where the air conditioning system 100 is installed. The multi-type air conditioning system 100 is connected to a central control unit 200 via a signal converter 300. Individual control of the indoor units 110 and the outdoor units 120 is possible using each of the indoor units 110 that are disposed respectively in rooms of the building. Central control of the multi-type air conditioning system 100 for the entirety of the building is also possible using the central control unit 200 located at a place such as a management room in the building.

The central control system of air conditioners does not require a machine room and can reduce initial investment costs by 30 to 40% and operating costs by 40 to 50%, compared to conventional central air conditioning equipment. The central control system of air conditioners can also provide heating depending on indoor units, enabling various air conditioning functions.

The indoor units 110 as shown in FIG. 2 are installed respectively in the rooms of the building. Any type of indoor unit such as a ceiling-mounted indoor unit, a wall-mounted indoor unit and a standing indoor unit can be used as the indoor unit 110. The indoor units 110 may have different power consumptions depending on the type or model thereof. Each of the outdoor units 120 is connected to a plurality of the indoor units 110 and controls circulation of refrigerant according to a control command to provide air conditioning in each room.

The outdoor unit 120 is connected to the central control unit 200 via the network as shown in FIG. 2. The central control unit 200 monitors the state of each air conditioner (i.e., each of the indoor and outdoor units), and transmits control commands to each air conditioner to perform central control of detailed operations of each air conditioner. In addition, the central control unit 200 calculates the amount of current power consumption of the multi-type air conditioning system in operation, and performs peak power control if the calculated amount of current power consumption exceeds a reference management power value.

The signal converter 300 is connected between the multi-type air conditioning system 100 and the central control unit 200. The signal converter 300 relays signals between the multi-type air conditioning system and the central control unit 200 while performing mutual conversion of different communication protocol signals for allowing smooth signal exchange therebetween.

The indoor and outdoor units 110 and 120 of the multi-type air conditioning system 100 are connected to each other via RS-485 communication lines to perform serial communication, and thus the indoor and outdoor units 110 and 120 are connected to the signal converter 300 via an RS-485 communication line. Since the central control unit 200 performs networking via an Ethernet line, the signal converter 300 intermediates RS-485 protocol signals with Ethernet protocol signals.

The RS-485 is a serial interface standard, which allows connection of up to 32 drivers and up to 32 receivers with transmission distances up to 1200 meters. The RS-485 is effective in that it allows a larger number of nodes per line than another serial interface standard RS-422, due to use of drivers and receivers of low impedance.

The multi-type air conditioning system 100 is connected with the signal converter 300 via such an RS-485 communication line in a multi-drop configuration in which multiple drivers and receivers are connected to a single serial bus, allowing optional data transmission.

The Ethernet uses a coaxial cable to implement a network in a bus topology in which terminal devices can optionally be connected to a single cable. The Ethernet also provides a data rate of 10 Mbps. For data transmission, the Ethernet employs a CSMA/CD (Carrier Sense Multiple Access with Collision Detection) scheme to avoid data collisions between different devices. According to the CSMA/CD scheme, one device intending to transmit data uses an electrical signal to check whether another device is using the network, and then transmits data when the network is empty, preventing the data collisions.

The signal converter 300 performs mutual conversion of different protocol signals to allow smooth communication between the multi-type air conditioning system 100 and the central control unit 200 that generate signals of different protocols.

Figure 3:
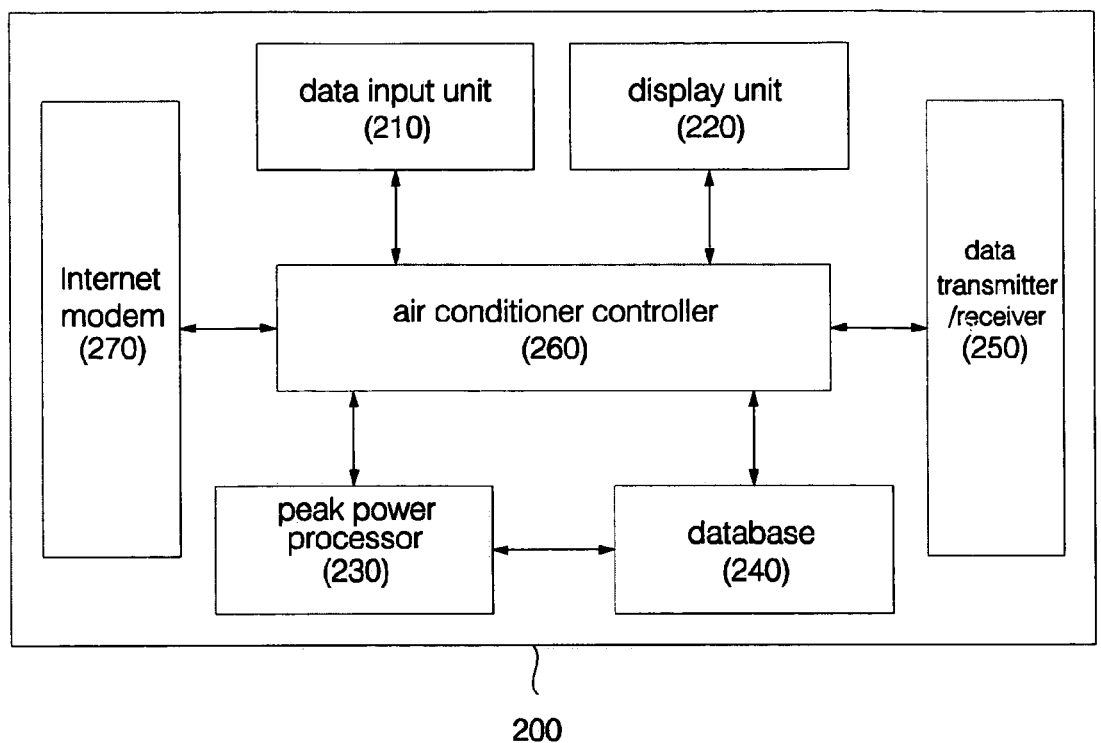
FIG. 3 is diagram showing the configuration of a central control unit according to the present invention.

The configuration of the central control unit 200 according to the present invention will now be described with reference to FIG. 3. The central control unit 200 basically includes a data input unit 210 and a display unit 220. The data input unit 210 is used to input control commands, equipment information for peak power control, and a reference management power value for power management of the multi-type air conditioning system 100. The display unit 220 displays current power consumption of the multi-type air conditioning system 100 obtained by real time monitoring thereof, and the state information of the multi-type air conditioning system 100 controlled by a forcible operation algorithm. The state information of the multi-type air conditioning system 100 includes a current operating rate of the air conditioners of the multi-type air conditioning system 100. According to manufacturers, the data input unit 210 and the display unit 220 may be integrated into a touch screen monitor.

An air conditioner manager of the building determines and inputs the reference management power value, taking into consideration different upper power limits allocated by an electricity utility company depending on seasons/buildings/service providers. The reference management power value is a reference value based on which the central control unit 200 determines when to activate the peak power control.

The central control unit 200 further includes a peak power processor 230, a database 240, a data transmitter/receiver 250 and an air conditioner controller 260 and an Internet modem 270.

The data transmitter/receiver 250 performs data transmission and reception to and from the multi-type air conditioning system 100 via a network. Through the data transmitter/receiver 250, the central control unit 200 transmits control commands and receives data of operating states from air conditioners operating according to the control commands.

The database 240 has previously stored equipment information of the multi-type air conditioning system 100 such as power consumption and pipe length of each of the indoor units 110 and the outdoor units 120 of the multi-type air conditioning system 100.

Based on the equipment information stored in the database 240, the peak power processor 230 calculates a total power consumption of the multi-type air conditioning system 100. The air conditioner controller 260 performs the peak power control in such a manner that it switches operating modes of the multi-type air conditioning system 100 so that the calculated total power consumption does not exceed the reference management power value input by the manager.

The indoor units 110 of the multi-type air conditioning system 100 have different power consumptions depending on the type or model of the indoor units 110. Even when only one of a plurality of indoor units sharing an outdoor unit is in operation, the outdoor unit consumes at least about 30% of power consumption of the outdoor unit in full operation (i.e., power consumption of the outdoor unit when all of the plurality of indoor units are in operation) due to the characteristics of the multi-air conditioning system 100. For this reason, the total power consumption of the multi-type air conditioning system 100 in operation is not linearly proportional to the number of indoor units in operation, but must be calculated based on various factors.

The central control unit 200 according to the present invention thus refers to detailed data of each room, such as indoor temperature, an operating mode and an operating state thereof, stored in the database 240 in order to calculate the total power consumption of the multi-type air conditioning system 100.

A performance value of each of the indoor units 110 is calculated based on the level of indoor temperature compared to outdoor temperature, a load correction value processed by the outdoor unit 120, a pipe correction value according to the length of a pipe connected with the outdoor unit 120, and the like. Based on the calculated performance value of each of the indoor units 110 and the performance value each of the outdoor units 120, the peak power processor 230 calculates the current total power consumption of the multi-type air conditioning system 100 in operation.

The peak power processor 230 can calculate in real time the total power consumption of air conditioners in operation. Alternatively, after a total power consumption according to each factor is previously calculated and stored in the form of a data table in the database 250, the peak power processor 230 can refer to the stored data table in real time to obtain the total power consumption.

The air conditioner controller 260 compares the current total power consumption calculated in the peak power processor 230 with the reference management power value input by the manager. If the compared result is that the total power consumption exceeds the reference management power value, the air conditioner controller 260 executes the forcible operation algorithm for the peak power control. If the total power consumption of air conditioners in operation is higher than the reference management power value, the forcible operation algorithm allows selected air conditioners in operation to maintain the cooling or heating mode and forces the remaining air conditioners (i.e., unselected ones) in operation to switch to a blowing mode.

The unselected air conditioners operating in the blowing mode serve to approximately maintain indoor temperature with lower power consumption. It is thus possible to reduce the total power consumption below the reference management power value since only the selected air conditioners are allowed to operate in the cooling or heating mode.

During the peak power control using the forcible operation algorithm, individual control locking is automatically enabled, making it impossible to perform the individual control using the indoor unit 110 in each room. If the total power consumption is reduced below the reference management power value to stop the peak power control, the individual control through the indoor unit 110 becomes possible.

The central control unit 200 further includes the Internet modem 270 that transmits and receives signals for allowing remote control through the Internet. A remote user can perform peak power control of the multi-type air conditioning system 100 by gaining access to the central control unit 200 over the Internet.

Figure 4:
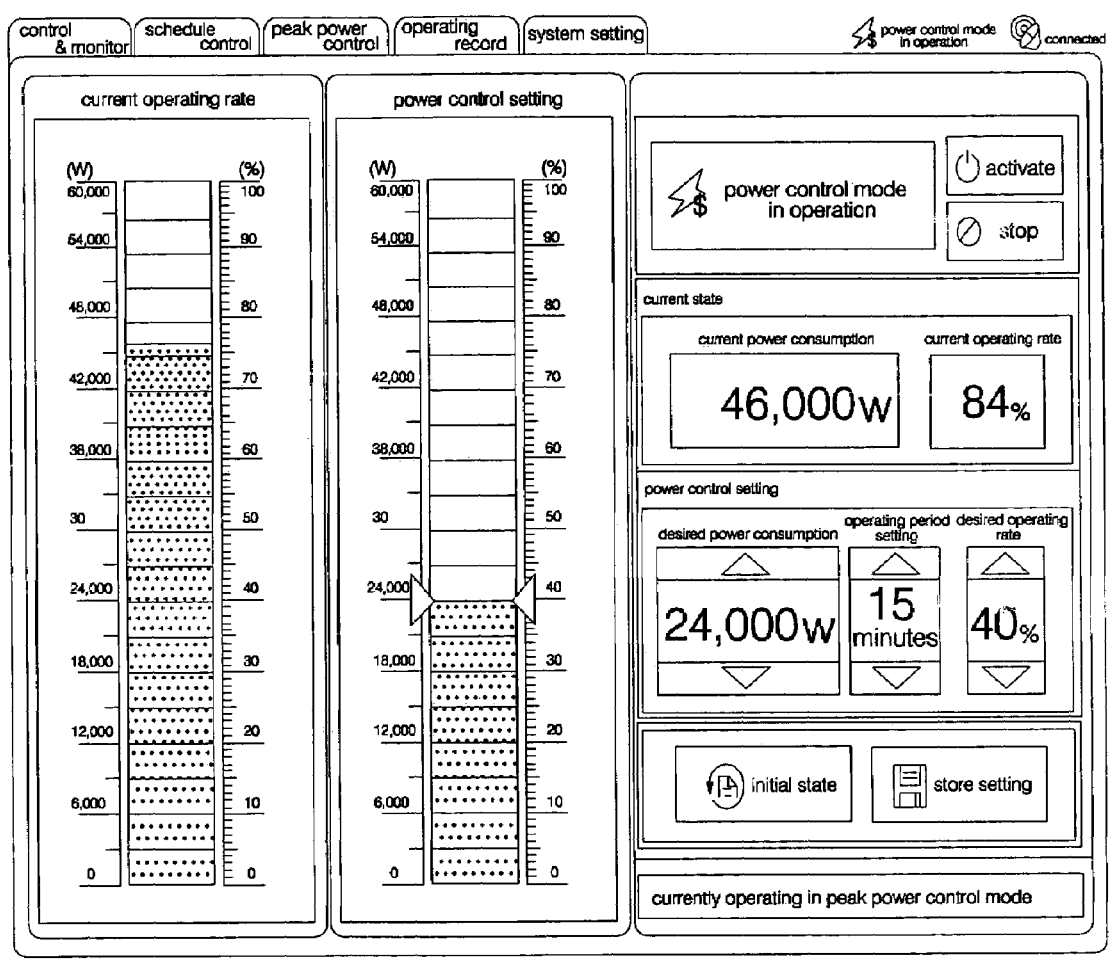
FIG. 4 is a screenshot of a control program displayed on a display unit of the central control unit according to the present invention.

FIG. 4 is a screenshot of a program for controlling the multi-type air conditioning system, which is executed in the central control unit 200 according to the present invention and displayed on the display unit 220. It can be seen from FIG. 4 that the central control unit 200 currently operates in a peak power control mode.

FIG. 4 shows that a manager has input 24,000 W as a reference management power value (i.e., desired power consumption), and 40% as a desired operating rate. The operating rate refers to the ratio of the number of air conditioners in operation to the total number of air conditioners. The manager sets the operation rate through the data input unit 210.

The manager can determine an operating mode change period, at intervals of which the operating modes of the air conditioner are changed, according to the operating rate, and taking into consideration air conditioner usage environments (room size, outdoor temperature, indoor conditions, comfort, etc.). The manager inputs the operating mode change period through the data input unit 210. In this embodiment, the operating mode change period is set to 15 minutes as shown in FIG. 4. In the multi-type air conditioning system 100 according to this embodiment, the central control unit 200 performs the peak power control if the total power consumption exceeds 24,000 W. During the peak power control, the central control unit 200 allows 40% of the total air conditioners to maintain the cooling or heating mode and to force the remaining air conditioners, that is 60% thereof, to maintain the blowing mode. If the operating mode change period (15 minutes) has passed, the operating mode of each air conditioner is reset.

If 10 indoor units are connected to the multi-type air conditioning system 100, the 10 indoor units operate alternately, four every 15 minutes. If it is monitored by the central control unit 200 that the current power consumption and the current operating rate of the multi-type air conditioning system 100 in operation are 46,000 W and 84% as shown in FIG. 4, the air conditioner controller 260 performs the peak power control to forcibly switch the operating modes of the air conditioners currently in operation, thereby returning to the desired power consumption (24,000 W in this embodiment) and the desired operating rate (40% in this embodiment).

To improve the manager's convenience, the power control program executed by the central control unit 200 allows the power consumption and operating rate varying in real time to be displayed not only in numerical form on the right side of the screen of the program but also in bar form on the left side.

The manager can easily input the desired power consumption by dragging a corresponding bar on the left side of the screen.

Figure 5:
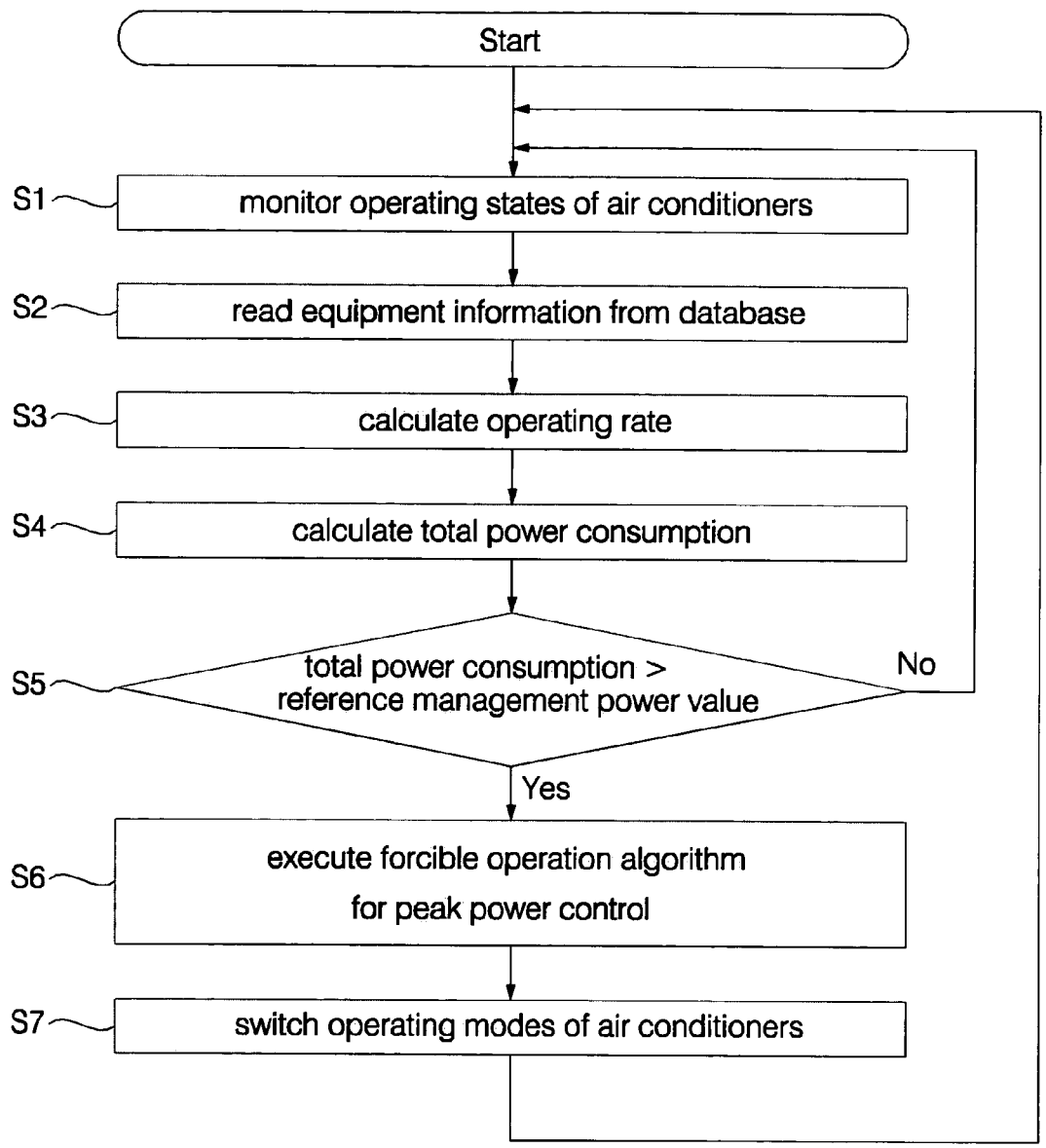
FIG. 5 is a flow chart showing a method for operating the central control system of air conditioners according to the present invention.

A method for operating the central control system of air conditioners configured as described above will now be described with reference to a flow chart shown in FIG. 5.

First, the central control system monitors operating states of air conditioners currently in operation of the multi-type air conditioning system (S1).

The central control system reads equipment information of each of the air conditioners stored in the database (S2), and calculates a current operating rate of the air conditioners (the ratio of the number of the air conditioners currently in operation to the total number of the air conditioners) (S3). The equipment information includes various factors of each indoor unit such as basic power consumption, indoor temperature, outdoor temperature, a current operating mode, an operating state, load caused by a corresponding outdoor unit, pipe information, etc. The total power consumption is calculated based on these factors (S4).

The air conditioner controller reads a reference management power value preset in the database, and compares the calculated total power consumption with the read reference management power value (S5).

If the total power consumption exceeds the reference management power value, the peak power control is activated (S6) to switch operating modes of the air conditioners for allowing selected air conditioners in operation to operate in the cooling or heating mode, and allowing the remaining air conditioners in operation to operate in the blowing mode.

As the operating modes of the air conditioners are switched according to the peak power control (S7), the total power consumption of the air conditioners is limited below the reference management power value.

While the peak power control is performed, individual control locking is automatically enabled, making it impossible to perform individual control of each of the air conditioners, thereby providing improved management of power of the multi-type air conditioning system.

As apparent from the above description, a central control system of air conditioners and a method for operating the same according to the present invention have the following features and advantages. Equipment information of indoor and outdoor units are previously stored in a database of a central control unit that is connected to a multi-type air conditioning system and can perform central control of each air conditioner of the multi-type air conditioning system. Based on the equipment information of the indoor and outdoor units, the central control system can perform more accurate calculation of total power consumption of the air conditioning system. If the total power consumption exceeds a reference management power value, the central control system automatically changes operating modes of the air conditioners (i.e., the indoor and outdoor units). The present invention thus facilitates management of air conditioning power, and is economical due to decrease in air conditioning power consumption and electricity costs.

Although the central control system of air conditioners and the method for operating the same according to the present invention have been disclosed for illustrative purposes, those skilled in the art will appreciate that various modifications, additions and substitutions are possible, without departing from the scope and spirit of the invention as disclosed in the accompanying claims.

What is claimed is:

1. A central control system of air conditioners, comprising:
   a multi-type air conditioning system including a plurality of indoor units for air conditioning installed in rooms of a building and an outdoor unit for controlling circulation of refrigerant, said plurality of indoor units sharing the outdoor unit;
   a central control unit connected to the multi-type air conditioning system via a network, said central control unit performing central control of operations of the multi-type air conditioning system or performing monitoring of states thereof, said central control unit performing peak power control if a current power consumption of the multi-type air conditioning system, calculated based on operating states of the multi-type air conditioning system, exceeds a previously input reference management power value; and
   a signal converter connected between the multi-type air conditioning system and the central control unit, said signal converter performing mutual conversion of different protocol signals communicated between the multi-type air conditioning system and the central control unit,
   wherein the central control unit includes:
   a data transmitter/receiver for data transmission and reception to and from the multi-type air conditioning system via a network;
   a database for storing equipment information of power consumption and a pipe length of each of the indoor and outdoor units of the multi-type air conditioning system;
   a peak power processor for calculating a total power consumption of outdoor and indoor units in operation based on the power consumption of each of the outdoor and indoor units stored in the database; and
   an air conditioner controller for performing peak power control to change operating modes of the outdoor and indoor units according to a forcible operation algorithm if the total power consumption calculated by the peak power processor exceeds the reference management power value.

2. The system according to claim 1, wherein the multi-type air conditioning system includes one of a cooling only air conditioner in which refrigerant is circulated in one direction and an air conditioner for both cooling and heating in which refrigerant is circulated in two directions.

3. The system according to claim 1, wherein the multi-type air conditioning system is connected to the signal converter via an RS-485 communication line.

4. The system according to claim 1, wherein the central control unit is connected to the signal converter via an Ethernet communication line.

5. The system according to claim 1, wherein the forcible operation algorithm is implemented to change the operating modes of the outdoor and indoor units to one of a cooling/heating mode and a blowing mode if the total power consumption of the indoor and outdoor units in operation exceeds the reference management power value.

6. The system according to claim 1, wherein the forcible operation algorithm is implemented to automatically enable locking of individual control of the indoor and outdoor units during the peak power control, making the individual control impossible.

7. The system according to claim 1, wherein the central control unit further includes an Internet modem for transmitting and receiving signals to allow remote control via the Internet.

8. The system according to claim 1, wherein the central control unit further includes:
  a data input unit for inputting the equipment information of each of the indoor and outdoor units, a control command, and a reference management power value for management of power of the multi-type air conditioning system; and
  a display unit for displaying information of states of the multi-type air conditioning system, said information being monitored in real time, said information of states including at least one of a current power consumption of the multi-type air conditioning system and a current operating rate thereof.

9. The system according to claim 8, wherein the data input unit includes a touch screen into which the display unit is integrated, allowing data input by touching the touch screen.

10. The system according to claim 8, wherein the data input unit receives a desired operating mode change period, at intervals of which the operating modes of the indoor and outdoor units are changed, and a desired operating rate of the multi-type air conditioning system, and transfers the received operating mode change period and operating rate to the air conditioner controller.

11. The system according to claim 1, wherein the equipment information includes a pipe length of each of the indoor and outdoor units of the multi-type air conditioning system.

12. A method for operating a central control system of air conditioners, said central control system including a central control unit connected with a multi-type air conditioning system via a network, said multi-type air conditioning system including an outdoor unit connected to the central control unit and a plurality of indoor units connected to the outdoor unit, said central control unit performing central control of operations of the indoor and outdoor units, said method comprising:
  calculating a current total power consumption of the multi-type air conditioning system in operation based on equipment information of the multi-type air conditioning system previously stored in a database of the central control unit;
  comparing the total power consumption with a previously input reference management power value; and
  performing peak power control to change operating modes of the indoor and outdoor units if the result of the comparing is that the total power consumption exceeds the reference management power values,
  wherein the performing includes allowing at least one selected indoor unit currently in operation to operate in a cooling or heating mode and allowing at least one remaining indoor unit in operation, other than the selected indoor unit, to operate in a blowing mode, so as to decrease the total power consumption.

13. The method according to claim 12, wherein the performing includes the step of automatically enabling locking of individual control of the indoor and outdoor units during the peak power control, making the individual control impossible.

* * * * *

UNITED STATES PATENT AND TRADEMARK OFFICE
CERTIFICATE OF CORRECTION

PATENT NO. : 7,287,393 B2 Page 1 of 1
APPLICATION NO. : 10/847369
DATED : October 30, 2007
INVENTOR(S) : Jae Hwan Kwon et al.

It is certified that error appears in the above-identified patent and that said Letters Patent is hereby corrected as shown below:

At column 10, line 29, (claim 12, line 20) of the printed page, please change "values" to --value--.

Signed and Sealed this

Seventeenth Day of June, 2008

JON W. DUDAS
*Director of the United States Patent and Trademark Office*